(12) United States Patent
Iyer

(10) Patent No.: US 7,324,489 B1
(45) Date of Patent: Jan. 29, 2008

(54) MANAGING NETWORK SERVICE ACCESS

(75) Inventor: Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1237 days.

(21) Appl. No.: 10/368,718

(22) Filed: Feb. 18, 2003

(51) Int. Cl.
*H04Q 7/24* (2006.01)

(52) U.S. Cl. .............. 370/338; 370/401; 455/422.1

(58) Field of Classification Search ............... None
See application file for complete search history.

(56) References Cited

U.S. PATENT DOCUMENTS

| | | | |
|---|---|---|---|
| 6,687,252 B1* | 2/2004 | Bertrand et al. ............ 370/401 |
| 6,970,694 B2* | 11/2005 | Shaheen ................ 455/414.1 |
| 7,152,160 B2* | 12/2006 | Lantto et al. ............. 713/168 |
| 2002/0010683 A1* | 1/2002 | Aune ......................... 705/67 |
| 2002/0087701 A1* | 7/2002 | Siikaniemi ................. 709/227 |
| 2003/0026230 A1* | 2/2003 | Ibanez et al. ............. 370/338 |
| 2003/0112793 A1* | 6/2003 | Sengodan ................. 370/352 |
| 2003/0152048 A1* | 8/2003 | Soininen et al. ........... 370/328 |
| 2003/0198211 A1* | 10/2003 | Tsao .......................... 370/349 |
| 2004/0128379 A1* | 7/2004 | Mizell et al. .............. 709/224 |
| 2004/0131023 A1* | 7/2004 | Auterinen .................. 370/328 |
| 2004/0198365 A1* | 10/2004 | Verma et al. ............. 455/452.1 |
| 2006/0111077 A1* | 5/2006 | Hurtta ........................ 455/406 |

OTHER PUBLICATIONS

3rd Generation Partnership Project; Technical Specification Group Core Network; Customised Applications for Mobile network Enhanced Logic (CAMEL) Phase 3—Stage 2 (Release 1999); 3GPP TS 23.078 V3.11.0 (Dec. 2001) Technical Specification; pp. 1-436.
3rd Generation Partnership Project; Technical Specification Group Core Network; Packet Domain; Interworking between the Public Land Mobile Network (PLMN) supporting Packet Based Services and Packet Data Networks (PDN) (Release 4); 3GPP TS 29.061 V4.3.0 (Dec. 2001) Technical Specification, pp. 1-57.
3rd Generation Partnership Project; Technical Specification Group Services and System Aspects; General Packet Radio Service (GPRS); Service description; Stage 2 (Release 1999); 3GPP TS 23.060 V3.12.0 (Jun. 2002) Technical Specification; Global System For Mobile Communications, pp. 1-202.

* cited by examiner

*Primary Examiner*—Bob A. Phunkulh
(74) *Attorney, Agent, or Firm*—Baker Botts L.L.P.

(57) ABSTRACT

Managing network service access includes receiving a packet data service request. The packet data service request is associated with a mobile subscriber and a service identifier that can bypass validation for accessing a traffic destination. Access is requested from an access node in response to the packet data service request. The access node maps a target access point to the mobile subscriber, where the target access point provides the mobile subscriber with access to the traffic destination. An access acceptance message is received from the access node, where the access acceptance message identifies the target access point. A packet data context is created by associating the target access point with the mobile subscriber to allow the mobile subscriber to access the traffic destination.

14 Claims, 3 Drawing Sheets

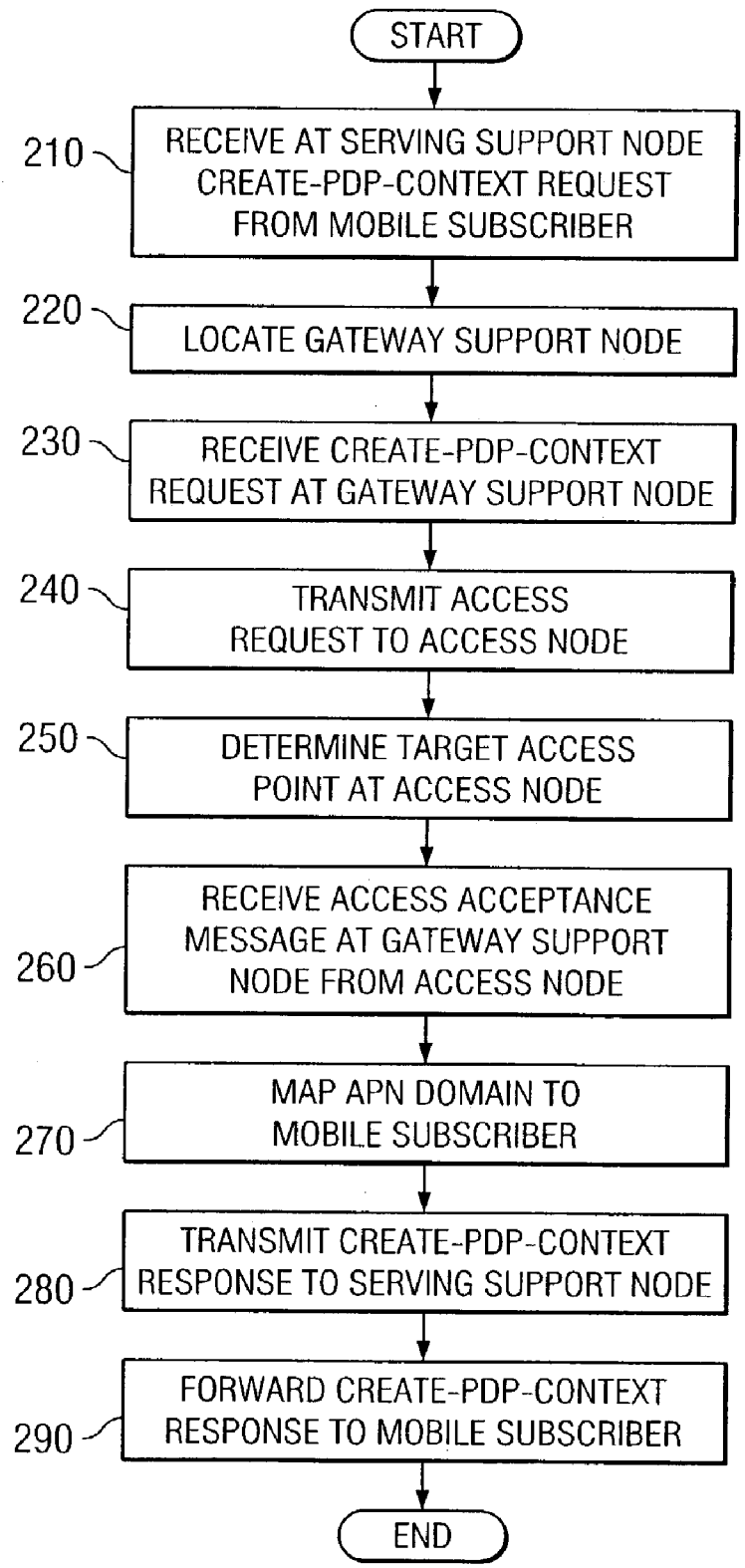

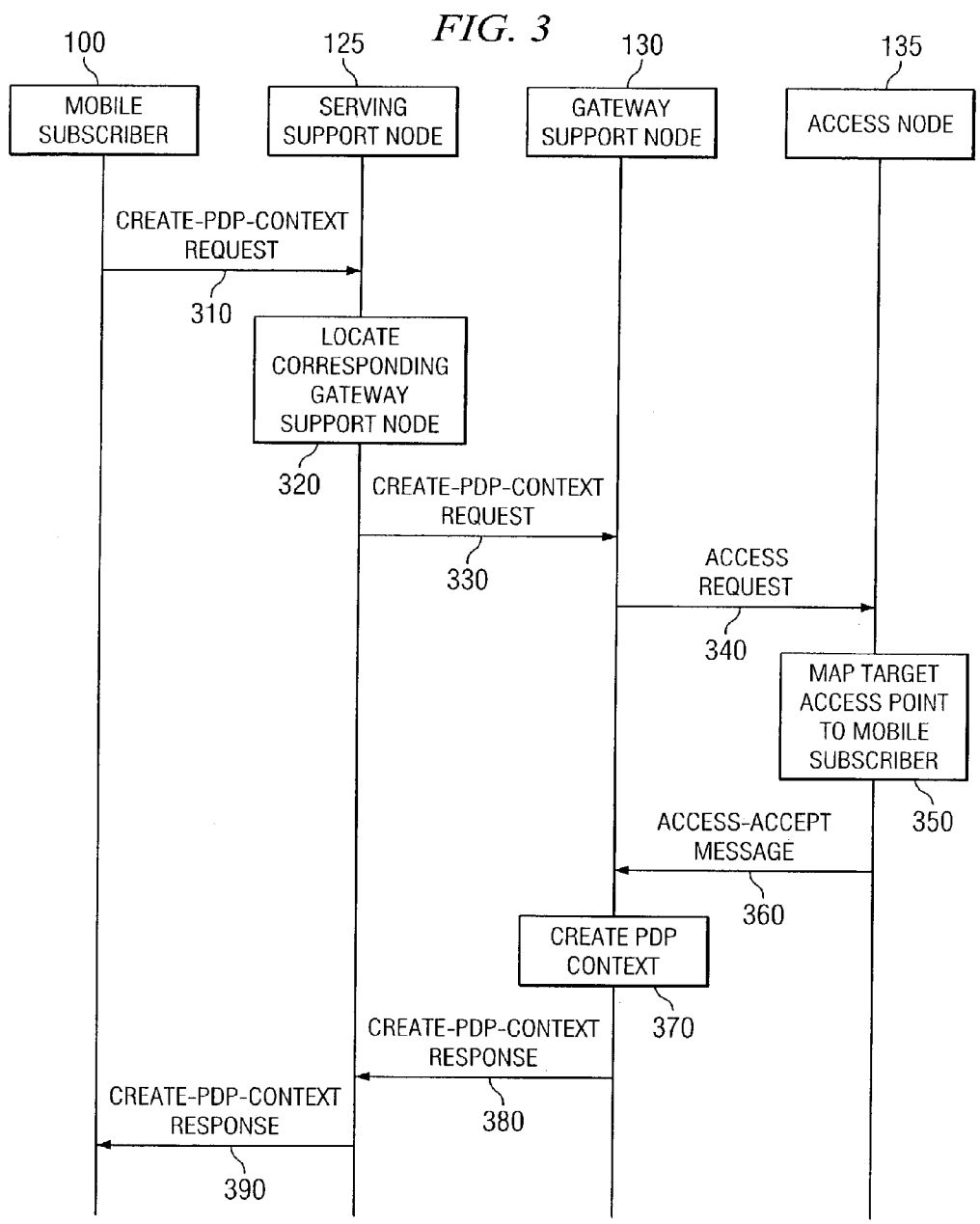

MANAGING NETWORK SERVICE ACCESS

TECHNICAL FIELD OF THE INVENTION

This invention relates generally to the field of telecommunication systems and more specifically to managing network service access.

BACKGROUND OF THE INVENTION

A mobile subscriber typically requires provisioning in order to access a communication network. Known techniques for provisioning the mobile subscriber require managing the programming for each mobile subscriber, as well as configuring a Home Location Register (HLR) for validating access requests of mobile subscribers. These known techniques for managing access, however, involve cumbersome programming of mobile subscribers and HLR. Accordingly, known techniques may be challenging for managing access for a continuously expanding network and an ever growing base of mobile subscribers. Consequently, known techniques for managing network service access are unsatisfactory in certain situations.

SUMMARY OF THE INVENTION

In accordance with the present invention, disadvantages and problems associated with previous techniques for managing network service access may be reduced or eliminated.

According to one embodiment, managing network service access includes receiving a packet data service request. The packet data service request is associated with a mobile subscriber and a service identifier that can bypass validation for accessing a traffic destination. Access is requested from an access node in response to the packet data service request. The access node maps a target access point to the mobile subscriber, where the target access point provides the mobile subscriber with access to the traffic destination. An access acceptance message is received from the access node, where the access acceptance message identifies the target access point. A packet data context is created by associating the target access point with the mobile subscriber to allow the mobile subscriber to access the traffic destination.

Certain embodiments of the invention may provide one or more technical advantages. A technical advantage of one embodiment may be that management of access to network services is more centrally located, so that Access Point Name validation by a Home Location Register may be bypassed. Another technical advantage of one embodiment may be that Access Point Names may be assigned by a more centrally located node, which may improve the efficiency of provisioning the mobile subscriber and the Home Location Register.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a flowchart demonstrating one embodiment of a method for managing network service access; and FIG. 3 is a call flow diagram illustrating one embodiment of a call flow for managing network service access.

DETAILED DESCRIPTION OF THE DRAWINGS

Figure 1:
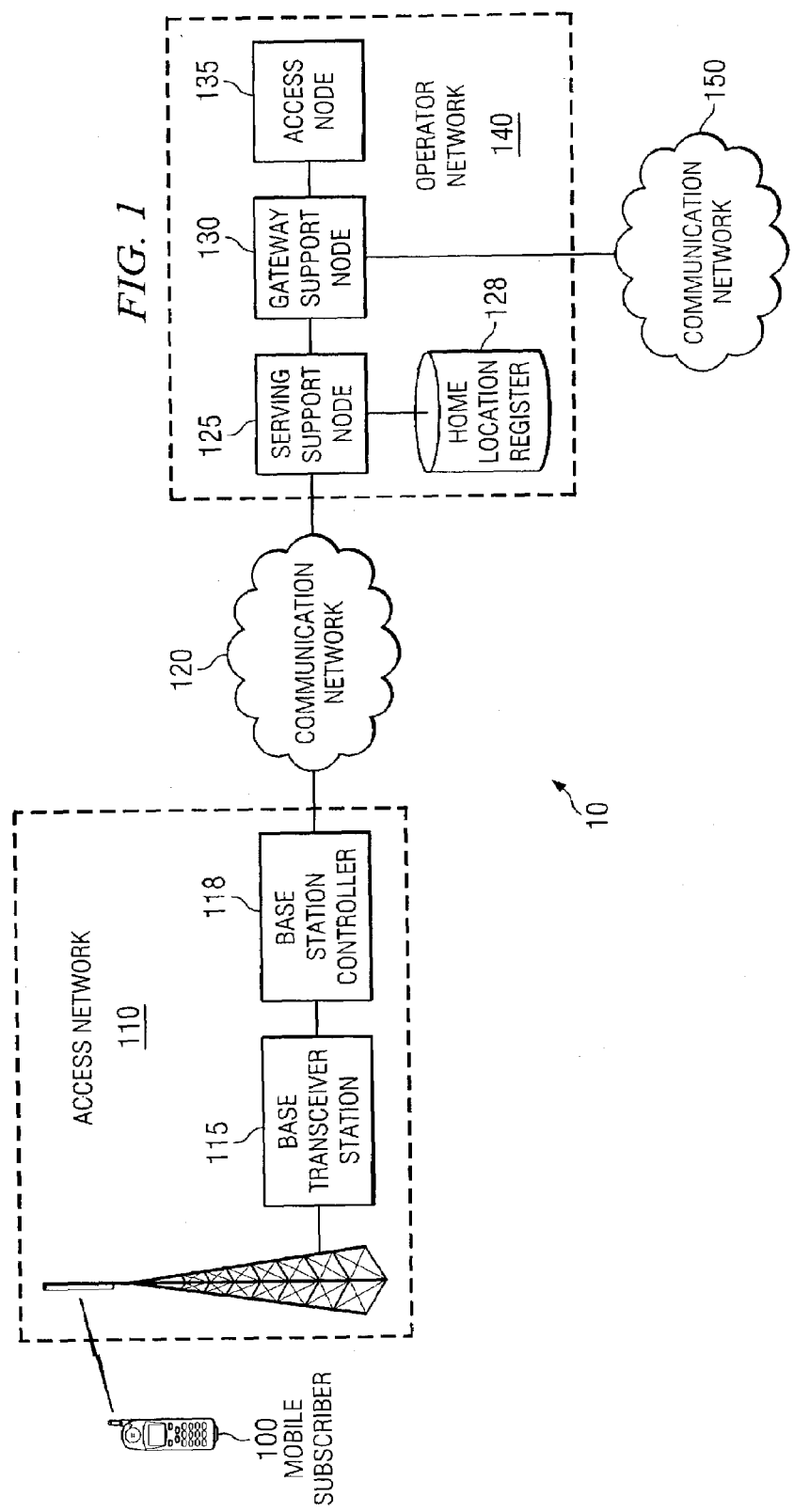
FIG. 1 is a block diagram of one embodiment of a system for managing network service access.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 for managing network service access. In general, system 10 allows a mobile subscriber 100 to access a communication network 150 to obtain packet data service from system 10. An operator network 140 screens and authenticates access requests by mobile subscriber 100, and assigns communication network 150 to mobile subscriber 100. Because operator network 140 performs these operations, mobile subscriber 100 does not need to be validated by Home Location Register (HLR) 128. Accordingly, programming of excess parameters at mobile subscriber 100 and HLR 128 may be avoided, which may provide a more efficient system.

According to the illustrated embodiment, system 10 comprises a mobile subscriber 100, an access network 110, a communication network 120, an operator network 140, and a communication network 150, coupled as shown in FIG. 1. In operation, mobile subscriber 100 obtains access through access network 110. Access network 110 facilitates a communication link from mobile subscriber 100 to operator network 140 through a communication network 120. Operator network 140 receives mobile subscriber 100 information with which operator network 140 may screen mobile subscriber 100, assign a target access point to mobile subscriber 100, and connect mobile subscriber 100 to communication network 150.

Mobile subscriber 100 communicates with system 10. Mobile subscriber 100 may comprise, for example, a personal digital assistant, a cellular telephone, a mobile handset, or any other device suitable for communicating with system 10. According to one embodiment, mobile subscriber 100 comprises a wireless device operable to communicate with system 10 using General Packet Radio Service (GPRS) protocol. Any other suitable communication protocol may be supported by mobile subscriber 100, for example, High Speed Circuit Switch Data (HCSD), Enhanced Data GSM Environment (EDGE), Universal Mobile Telecommunications Service (UMTS), or any other communication protocol suitable for use in digital mobile telecommunication systems.

Mobile subscriber 100 is programmed with a mobile identifier. The mobile identifier may comprise any parameter suitable for identifying mobile subscriber 100. For example, the mobile identifier may comprise an International Mobile Subscriber Identity (IMSI), a Mobile Station Integrated Services Digital Network (MSISDN), an Electronic Serial Number (ESN), a user identifier, a password, an access code, a login name, a telephone number, or some, none, or all of the preceding. According to the illustrated embodiment, the mobile identifier comprises an International Mobile Subscriber Identity (IMSI).

Mobile subscriber 100 may be programmed with a service identifier. The service identifier may include any identifier suitable for indicating a data service category, for example, a default Access Point Name (APN). The default APN may be preconfigured at mobile subscriber 100 to ensure that mobile subscriber 100 receives packet data service from system 10. The default APN may include a parameter, an identifier, or any other suitable code operable to identify mobile subscriber 100 as a packet data service user. According to one embodiment, the default APN is substantially the same for mobile subscribers 100 of system 10. Default APNs, however, may differ to indicate different categories of access for mobile subscribers 100. For example, the default APN for one mobile subscriber 100 may comprise a corporate access default APN, and a different default APN for another mobile subscriber 100 may comprise an Internet default APN. Any other suitable assignment, categorization, or organization of default APNs may be used to program mobile subscribers 100.

Access network 110 comprises a base transceiver station 115 and a base station controller 118. Base transceiver station 115 communicates signals to and from mobile subscriber 100 by establishing a wireless link. Base station controller 118 manages the operation of base transceiver station 115. The wireless link between mobile subscriber 100 and access network 110 is typically a radio frequency link that may be cellular in a network organization. According to the illustrated embodiment, the radio frequency link between mobile subscriber 100 and access network 110 may use a 900 MHz or 1800 MHz frequency according to a Global System for Mobile Communication (GSM) protocol. Access network 110 may operate according to any other suitable mobile communication technology.

Communication network 120 couples access network 110 with an operator network 140. Communication network 120 may include any Internet Protocol (IP) network, Local Area Network (LAN), Metropolitan Area Network (MAN), Wide Area Network (WAN), global computer network such as the Internet, or any other appropriate wireline, wireless, or other network or link suitable for coupling access network 110 to operator network 140. According to the illustrated embodiment, communication network 120 comprises an IP network.

Operator network 140 provides network service access to mobile subscriber 100 by creating a PDP context for mobile subscriber 100. Operator network 140 comprises a serving support node 125, a home location register 128, a gateway support node 130, and an access node 135, coupled as shown in FIG. 1.

Serving support node 125 tracks mobile subscribers 100 throughout system 10 and transmits packet data from communication network 150 to the access network 110 operable to reach mobile subscriber 100. According to the illustrated embodiment, serving support node 125 processes a create-PDP-context request received from mobile subscriber 100 and selects a gateway support node 130 for mobile subscriber 100. According to the illustrated embodiment, serving support node 125 comprises a Serving GPRS Support Node (SGSN).

Serving support node 125 processes the create-PDP-context request received from mobile subscriber 100 through access network 110 to establish a context for accessing communication network 150. The create-PDP-context request may comprise any parameter suitable for creating a context. For example, the create-PDP-context request may comprise a default Access Point Name (APN). Home location register (HLR) 128 may screen the default APN using an HLR record to ensure that mobile subscriber 100 is a valid packet data subscriber of system 10. According to the illustrated embodiment, HLR 128 is not required to screen the default APN.

Serving support node 125 selects gateway support node 130 for mobile subscriber 100. Serving support node 125 may be configured to select a gateway support node 130 set as a default gateway support node 130. Any other selection process may be used by serving support node 125 to select gateway support node 130. For example, serving support node 125 may use round robin, preconfigured set up, intelligent name service, or close proximity selection, or any other suitable process to select gateway support node 130. According to the illustrated embodiment, serving support node 125 may select a default gateway support node 130 regardless of the default APN received.

Gateway support node 130 initiates the process of selecting a traffic destination corresponding to communication network 150. The traffic destination may comprise a network address, for example, the address of communication network 150. According to the illustrated embodiment, gateway support node 130 comprises a Gateway GPRS Support Node (GGSN). Gateway support node 130 may comprise an input, a processor, any other device suitable for providing gateway support at system 10, or some, none, or all of the preceding.

Access node 135 screens access requests, authenticates access to communication network 150, and assigns a target access point to mobile subscriber 100. According to the illustrated embodiment, access node 135 comprises an Authentication, Authorization, and Accounting (AAA) server.

Access node 135 screens access requests of mobile subscriber 100 by verifying the mobile identifier at a user-profile database. Access node 135 includes a user-profile database comprising a user profile. The user profile may comprise the mobile identifier of mobile subscriber 100, target APN associated with the mobile subscriber 100, type of access information, billing information of mobile subscriber 100, user name of mobile subscriber 100, password associated with the user name of mobile subscriber 100, any other suitable parameter for managing access to network service for mobile subscriber 100, or some, none, or all of the preceding.

Access node 135 may access the user-profile database using a Remote Access Dial-In User Server (RADIUS) protocol interface. The RADIUS protocol comprises a protocol layer that access node 135 may use to manage retrieval of the user profile, validation of access of mobile subscriber 100, initiation of billing information for communication data sessions, mapping of target APNs to a mobile subscriber 100, and any other activity access node 135 may perform at system 10. Any other suitable protocol may be used by access node 135 without departing from the scope of the invention.

Access node 135 authenticates mobile subscriber 100 to ensure only valid users may access the packet data service at system 10. According to the illustrated embodiment, access node 135 accesses the user-profile database to validate access of mobile subscriber 100. The user-profile database may include information for validating mobile subscriber 100. For example, the user-profile database may include validation information regarding the time or days mobile subscriber 100 is allowed to access communication network 150, information on whether mobile subscriber 100 is a valid user of communication network 150, information about accounting for a prepaid service that mobile subscriber 100 may access, or any other suitable access information about mobile subscriber 100 suitable for determining the validity of the access of mobile subscriber 100 to communication network 150.

Access node 135 assigns a target access point to mobile subscriber 100. Access node 135 is operable to select a target access point, for example, a target APN, corresponding to a mobile identifier received from gateway support node 130. The target APN may identify an access point to communication network 150. The target APN may comprise a domain name, a network identifier, a network address, or any other suitable external network identifier. The assigned target access point allows gateway support node 130 to create the PDP context requested by mobile subscriber 100.

According to the illustrated embodiment, access node 135 is provisioned with target access points associated with mobile subscribers 100, where each mobile subscriber 100 may have an associated target access point. As used in this document, "each" refers to each member of a set or each member of a subset of a set. Access node 135 may be provisioned with a list of target APNs corresponding to domain names available at system 10. For example, access node 135 may be provisioned with the target APN corresponding to communication network 150.

Communication network 150 provides data service to mobile subscriber 100. Communication network 150 may comprise any suitable network, Internet, public network, extranet, corporate Virtual Point Network (VPN), wireless or wireline network, or any other suitable communication network for providing packet data service to mobile subscriber 100. Communication network 150 may be accessed by gateway support node 130 using an address that may be stored at gateway support node 130. According to the illustrated embodiment, communication network 150 may comprise an intranet to which mobile subscriber 100 has access independent of access to system 10.

Various modifications, additions, or omissions may be made to system 10 without departing from the scope of the invention. For example, communication network 150 may comprise part or all of communication network 120 in some situations. As another example, gateway support node 130 may be coupled to a Domain Name Server (DNS) for locating IP addresses corresponding to communication network 150.

In summary, mobile subscriber 100 requests creation of a PDP context at system 10 by accessing access network 110. An operator network 140 receives the request from access network 110 and manages the request by assigning a target APN corresponding to communication network 150. Operator network 140 authenticates the mobile subscriber 100 and creates the PDP context for mobile subscriber 100 to communicate with communication network 150. Operator network 140 assigns a target APN so mobile subscriber 100 and HLR need not be provisioned with excess parameters. Accordingly, system 10 may provide more efficient management of access.

A flowchart demonstrating one embodiment of a method that may be used for managing network service access is described with reference to FIG. 2. A call flow diagram illustrating one embodiment of a call flow for managing network service access is described with reference to FIG. 3.

FIG. 2 is a flowchart demonstrating one embodiment of a method that may be used for managing network service access. The method begins at step 210, where serving support node 125 receives a packet data service request comprising a create-PDP-context request from mobile subscriber 100. The packet data service request is used to request creation of a context for data packet communication at system 10, and may be configured using Packet Data Protocol (PDP).

The create-PDP-context request may comprise the mobile identifier corresponding to mobile subscriber 100. According to the illustrated embodiment, the create-PDP-context request comprises an International Mobile Subscriber Identity (IMSI). Any other mobile identifier may be included in the create-PDP-context request. For example, the create-PDP-context request may include a default APN configured to bypass APN validation by HLR 128.

In response to the create-PDP-context request, serving support node 125 locates gateway support node 130 at step 220. According to one embodiment, serving support node 125 locates gateway support node 130 according to the default APN received from mobile subscriber 100.

Gateway support node 130 receives the create-PDP-context request from serving support node 125 at step 230. The create-PDP-context request comprises the mobile identifier and the default APN. In response to the create-PDP-context request, gateway support node 130 transmits an access request to access node 135 at step 240. The access request may include the mobile identifier and the default APN associated with mobile subscriber 100.

Access node 135 determines a target access point at step 250 in response to the access request. The target access point is used by mobile subscriber 100 to obtain packet data service. The target access point may comprise a target Access Point Name (APN) identifying communication network 150.

Access node 135 may also validate mobile subscriber 100 at step 250 to ensure that an unauthorized mobile subscriber 100 does not receive packet data service from system 10. Access node 135 may validate mobile subscriber 100 using validation information of the user profile.

The method proceeds to step 260, where gateway support node 130 receives an access acceptance message from access node 135. According to the illustrated embodiment, the access acceptance message may include an access-accept message comprising the target APN determined by access node 135. The access-accept message may include any other suitable data that gateway support node 130 may use to establish the PDP context requested by mobile subscriber 100.

In response to the access-accept message, gateway support node 130 maps an APN domain to mobile subscriber 100 at step 270 to create a PDP context. Gateway support node 130 may also select domain names from a Domain Name Server (DNS) such that the target APN may be mapped to a specific APN domain as specified by the DNS. The PDP context created by the mapping operates to provide a communication tunnel between serving support node 125 and gateway support node 130 such that mobile subscriber 100 may obtain packet data service from system 10.

Gateway support node 130 may also perform another level of authentication at step 270 to provide, for example, user validation, IP address allocation, or any other authentication as required by the target APN. Gateway support node 120 transmits a create-PDP-context response to serving support node 125 at step 280. At step 290, the serving support node 125 forwards the create-PDP-context response to mobile subscriber 100. After forwarding the create-PDP-context response at step 290, the method terminates.

Steps may be added, omitted, modified, or performed in any suitable order without departing from the scope of the invention. For example, transmitting the access request to access node 135 at step 240 may be modified to include transmitting a user name, a password, and IMSI to access node 135. As another example, a step may be added after step 270 where the gateway support node 130 creates the PDP context.

FIG. 3 is a call flow diagram illustrating one embodiment of a call flow for managing network service access. The call flow diagram describes messages sent among mobile subscriber 100, serving support node 125, gateway support node 130, and access node 135. The call flow begins when a mobile subscriber 100 sends a create-PDP-context request 310 to serving support node 125. In response to create-PDP-context request 310, serving support node 125 locates the corresponding gateway support node 130 at flow box 320. Serving support node 125 sends a create-PDP-context request 330 to gateway support node 130. In response to create-PDP-context request 330, gateway support node 130 sends an access request 340 to the access node 135.

Access node 135 maps a target APN to the mobile subscriber 100 at flow box 350. Access node 135 may determine user name and password parameters from the properties of mobile subscriber 100 in order for mobile subscriber 100 to gain access to communication network 150.

After mapping the target APN to the mobile subscriber 100, access node 135 sends an access-accept message 360 to gateway support node 130. In response to access-accept message 360, gateway support node 130 creates a PDP context at flow box 370. Gateway support node 130 sends serving support node 125 a create-PDP-context response 380. In response to create-PDP-context response 380, serving support node 125 forwards create-PDP-context response 390 to mobile subscriber 100. After receiving create-PDP-context response 390 at mobile subscriber 100, the call flow ends.

Messages may be added to or omitted from the call flow. For example, a flow box may be added before creating the PDP context at flow box 370, where gateway serving node 130 maps an APN domain to the mobile subscriber 100. As another example, flow box 320 may be omitted if serving support node 125 automatically routes create-PDP-context request 310 to gateway serving node 130. In addition, messages may be modified or performed in any suitable order. For example, access request 340 may be modified to include access information such as a user name, a password, IMSI, or any other suitable information that access node 135 may use to screen mobile subscriber 100.

Certain embodiments of the invention may provide one or more technical advantages. A technical advantage of one embodiment may be that management of network services is more centrally located, so that Access Point Name validation by a Home Location Register may be bypassed. Another technical advantage of one embodiment may be that Access Point Names may be assigned by a more centrally located node, which may improve the efficiency of provisioning the mobile subscriber and the Home Location Register.

Although an embodiment of the invention and its advantages are described in detail, a person skilled in the art could make various alterations, additions, and omissions without departing from the spirit and scope of the present invention as defined by the appended claims.

What is claimed is:

1. A method for managing network service access, comprising:
   receiving a packet data service request, the packet data service request associated with a mobile subscriber and a service identifier, the service identifier operable to bypass validation for accessing a traffic destination;
   requesting access from an access node in response to the packet data service request, the access node operable to assign a target access point to the mobile subscriber, the target access point operable to provide the mobile subscriber with access to the traffic destination;
   receiving an access acceptance message from the access node, the access acceptance message identifying the target access point; and
   creating a packet data context by associating the target access point with the mobile subscriber to allow the mobile subscriber to access the traffic destination.

2. The method of claim 1, further comprising transmitting a packet data context response to the mobile subscriber, the packet data context response comprising the target access point, the target access point comprising a domain name associated with a communication network accessible using the target access point.

3. The method of claim 1, further comprising selecting the target access point according to a user profile at the access node, the user profile comprising information associated with the mobile subscriber and one or more target access points.

4. The method of claim 1, wherein the mobile subscriber is associated with a mobile identifier selected from the group consisting of a password, a user name, a user identifier, a serial number, a login name, a login number, a telephone number, and an access code.

5. The method of claim 1, wherein the target access point comprises an Access Point Name (APN) identifying the traffic destination.

6. The method of claim 1, further comprising authenticating access to the traffic destination at the access node, the access node operable to assign to the mobile subscriber the target access point associated with the traffic destination in response to the authentication.

7. A system for managing network service access, comprising:
   an input operable to receive a packet data service request, the packet data service request associated with a mobile subscriber and a service identifier, the service identifier operable to bypass validation for accessing a traffic destination; and
   a processor operable to:
      request access from an access node in response to the packet data service request, the access node operable to assign a target access point to the mobile subscriber, the target access point operable to provide the mobile subscriber with access to the traffic destination;
      receive an access acceptance message from the access node, the access acceptance message identifying the target access point; and
      create a packet data context by associating the target access point with the mobile subscriber to allow the mobile subscriber to access the traffic destination.

8. The system of claim 7, wherein the processor is further operable to transmit a packet data context response to the mobile subscriber, the packet data context response comprising the target access point, the target access point comprising a domain name associated with a communication network accessible using the target access point.

9. The system of claim 7, wherein the access node is operable to select the target access point according to a user profile, the user profile comprising information associated with the mobile subscriber and one or more target access points.

10. The system of claim 7, wherein the mobile subscriber is associated with a mobile identifier selected from the group consisting of a password, a user name, a user identifier, a serial number, a login name, a login number, a telephone number, and an access code.

11. The system of claim 7, wherein the target access point comprises an Access Point Name (APN) identifying the traffic destination.

12. The system of claim 7, wherein the access node is operable to:
   authenticate access to the traffic destination; and
   assign to the mobile subscriber the target access point associated with the traffic destination in response to the authentication.

13. A system for managing network service access, comprising:
   means for receiving a packet data service request, the packet data service request associated with a mobile subscriber and a service identifier, the service identifier operable to bypass validation for accessing a traffic destination;
   means for requesting access from an access node in response to the packet data service request, the access node operable to assign a target access point to the mobile subscriber, the target access point operable to provide the mobile subscriber with access to the traffic destination;
   means for receiving an access acceptance message from the access node, the access acceptance message identifying the target access point; and
   means for creating a packet data context by associating the target access point with the mobile subscriber to allow the mobile subscriber to access the traffic destination.

14. A system for managing network service access, comprising:
   a gateway support node operable to:
      receive a packet data service request, the packet data service request associated with a mobile subscriber and a service identifier, the service identifier operable to bypass validation for accessing a traffic destination, the mobile subscriber associated with a mobile identifier selected from the group consisting of a password, a user name, a user identifier, a serial number, a login name, a login number, a telephone number, and an access code;
      request access from an access node in response to the packet data service request, the access node operable to assign a target access point to the mobile subscriber, the target access point operable to provide the mobile subscriber with access to the traffic destination, the target access point comprising an Access Point Name (APN) identifying the traffic destination;
      receive an access acceptance message from the access node, the access acceptance message identifying the target access point;
      create a packet data context by associating the target access point with the mobile subscriber to allow the mobile subscriber to access the traffic destination; and
      transmit a packet data context response to the mobile subscriber, the packet data context response comprising the target access point, the target access point comprising a domain name associated with a communication network accessible using the target access point; and
   the access node further operable to:
      select the target access point according to a user profile, the user profile comprising information associated with the mobile subscriber and one or more target access points;
      authenticate access to the traffic destination; and
      assign to the mobile subscriber the target access point associated with the traffic destination in response to the authentication.

* * * * *